Patented July 29, 1952

2,605,194

UNITED STATES PATENT OFFICE 2,605,194

SILOXANE RESINS

Earle J. Smith, Midland Township, Midland County, Mich., assignor to Dow Corning Corporation, Midland, Mich., a corporation of Michigan No Drawing. Application January 21, 1946, Serial No. 642,442

6 Claims. (Cl. 117—132)

The present invention relates to improved siloxane resins of particular utility in paint and enamel vehicles.

The siloxane resins are hydrophobic and of high dielectric capacity. These characteristics, together with their resistance to decomposition upon heating as compared with other organic compounds, indicate that this group of resins might have special utility for a considerable range of uses. While the siloxane resins have these properties in common, the other properties of these resins differ markedly, depending upon the specific siloxane polymer units which are present and the amounts thereof. For particular uses, special specific properties are frequently desirable.

Resins may be prepared containing either methyl or phenyl siloxane units of varying degrees of substitution. The known pure methyl siloxanes and the known pure phenyl siloxanes form coatings which are undesirable for the present purposes. The preparation of a resin by hydrolyzing the product of jointly coupling methyl and phenyl Grignard reagents with silicon tetrachloride has heretofore been described. The silicon compounds which are contained in the coupling product, and which are hydrolyzed in the process, may include unsubstituted silicon tetrachloride, as well as the two monoorgano, the three diorgano, and the four triorgano silicon compounds. This described resin is unsatisfactory for commercial production.

For paint and enamel vehicles, the physical consistency of the resins in solution and in airdried condition is of substantial importance. For commercial production of such resins, it is necessary to be able to duplicate the physical characteristics of the product, within reasonable limits. In producing this type of resin, it would be desirable to carry the polymerization to an advanced stage but short of insolubility. This gives the resin the high viscosity desirable in a vehicle and reduces the curing time in case the coating is cured by heating. To obtain duplication, it would be desirable for the rate of polymerization in the final stages of bodying to be low, since with a high rate at this stage, insoluble gels are frequently produced which gels are of no utility as vehicles.

It has now been found that the rate of polymerization in the final stages of bodying with methyl-, phenyl-, and methyl-phenyl siloxane copolymers is a function of the relative proportions of the various siloxane copolymer units.

The following are objects of the present invention: To provide improved siloxane resins; to provide siloxane resins which air dry from solution to a solid state; to provide siloxane resins of such a composition that the physical properties of the resin in bodied state can be reproduced readily and which resins are useful for paint and enamel vehicles; to provide siloxane resins of such composition that the physical properties of partially polymerized resins can be duplicated in commercial production; and to provide siloxane resins containing monomethyl siloxane copolymer units of such composition that the resins can be produced by commercial methods without substantial loss of monomethyl silicon derivatives. Other objects and advantages of this invention will be apparent from the following description.

In the siloxanes of the present invention, essentially all of the structural units are substantially as follows:

$CH_3SiO_{1.5}$
$C_6H_5SiO_{1.5}$
$CH_3C_6H_5SiO$

The methyl siloxane units are present in amount between 15 and 40 mol. per cent, the phenyl siloxane units between 25 and 55 mol. per cent, and the methyl phenyl siloxane units between 30 and 50 mol. per cent. The silicon atoms of the various siloxane structural units are linked together by the oxygen atoms thereof in an alternating lattice of oxygen and silicon atoms. While a major portion of the oxygen atoms of the units are linked to two silicon atoms, a portion of the oxygen atoms are active centers for further polymerization and are present as residual hydroxyl, alkoxy or like radicals. Also, when the siloxanes are prepared from halides, they may contain traces of halogen. A small percentage of such materials is present in all siloxanes until polymerization is entirely complete.

In accordance with a preferred form of this invention, the siloxanes hereof are partially condensed to a degree sufficient that paints and enamels employing these siloxanes as vehicles when air dried are at least tacky solids and of a degree insufficient that the siloxanes are insoluble in benzene. Particularly desirable compositions are condensed sufficiently that the paints or enamels may be air dried to non-tacky state.

The siloxanes hereof may be produced by hydrolyzing a mixture of readily hydrolyzable organo-silane derivatives. The mixture of derivatives which is hydrolyzed contains monomethyl silane, monophenyl silane and methyl phenyl silane derivatives in which the remaining valences of the silicon atoms are linked to hydrolyzable groups such as ethoxy groups and chloride. For commercial production the chloride derivatives are preferable since they are more economical to use.

The mixture which is hydrolyzed should be substantially free of hydrolyzable siliceous compounds other than derivatives of monomethyl silane, monophenyl silane, and methyl phenyl silane. The remaining valences of the silicon in these derivatives may be satisfied by any of the well known readily hydrolyzable radicals or elements, such as alkoxy, aroxy and amino radicals and halogens. These organosilicon derivatives may be obtained by any appropriate production method, such as by simultaneously coupling methyl and phenyl Grignard reagents with silicon in the form of tetrachlor silane or ethyl orthosilicate. By refining the crude reaction mixture the three desired silane derivatives may be obtained in commercially pure form in which they are substantially free of other hydrolyzable siliceous compounds which are in the reaction product, including silicon tetrachloride or ethyl orthosilicate. Alternatively, the methyl and phenyl Grignard reagents may be separately reacted with silicon tetrachloride to obtain by purification monomethyl and monophenyl silicon chlorides. The methyl phenyl silicon chloride may be produced by coupling a portion of the methyl silicon trichloride with a phenyl radical by a phenyl Grignard reagent, or by coupling a portion of the phenyl silicon trichloride with a methyl radical by a methyl Grignard reagent.

The hydrolysis may be readily effected by reacting the organosilicon derivatives with water. The temperature should be sufficiently low that, at the pressure employed, the methyl silane derivative does not evaporate rapidly. In any instance, where the rate of hydrolysis is low, the rate may be increased by the addition of a catalyst. It is convenient to employ an organic solvent, such as toluene, in the reaction mixture to collect the hydrolysis products as formed. While from a commercial standpoint it is preferable to hydrolyze the silane derivatives in mixture, practical results are also obtainable by hydrolyzing some of the materials separately and blending the hydrolysis products to the desired composition prior to extensive polymerization thereof.

When the silane derivatives which are hydrolyzed contain chlorsilanes, hydrogen chloride is a product of the hydrolysis. The hydrogen chloride may be either totally or partially retained in solution in the aqueous phase, depending upon the temperature, pressure, and amount of water present. For commercial production from organosilicon chlorides, compositions which contain over 40 mol. per cent of monomethyl siloxane are undesirable, since during the hydrolysis gels are produced from the monomethyl constituents. Such gels represent loss of material and cause the formation of emulsions during subsequent washing operations to remove hydrogen chloride.

When the silanes include alkoxy silanes, alcohol is a product of the hydrolysis and may likewise be retained in the aqueous phase. When using alkoxy silanes, it is desirable to add an alcohol to the hydrolysis medium to act as a solvent for the silane derivatives. The aqueous layer may be separated from the oil following hydrolysis or retained in mixture until after polymerization.

During hydrolysis, the hydrolysis product generally partially polymerizes. This partially polymerized material may be bodied by further partial condensation or polymerization, effected by heating to give it the desired viscosity and shorten curing times. With the higher percentages of methyl phenyl siloxane structural units, higher temperatures or longer times are generally necessary than with the lower percentages in order to effect the same amount of bodying. During the bodying, the solvent may be allowed to evaporate. Alternatively, solvent evaporation may be effected before bodying by warming under vacuum, whereby the solvent is evaporated prior to the temperature becoming sufficiently high that substantial bodying commences.

During bodying, polymerization or condensation occurs accompanied by loss of water. The viscosity of the material being bodied increases, with compositions proportioned as above indicated, at a relatively low rate throughout the bodying procedure, including the final stages of polymerization prior to gelation to an insoluble material.

For use in vehicles, the resins may be dissolved in any of the customary solvents such as benzene, toluene, xylene, naphtha, and acyclic petroleum thinners.

In use, the resin solution may be used directly as a varnish, or it may have a pigment such as aluminum powder added thereto. It has been above indicated that it is preferred for the resins to be bodied to a state in which the air-dried resin is a solid whereby it is possible to dispense with curing by heating. In any instance, paints or enamels containing the resins hereof may be cured by heating following application. During such curing, condensation to an insoluble state occurs. The resins which contain the lower percentages of monophenyl siloxane constituents within the range indicated are characterized in the cured state by their flexibility. Those resins which contain higher proportions of monophenyl siloxane units are less flexible but are considerably harder and somewhat brittle. Intermediate compositions have properties between the two. The flexibility of some of the harder but more brittle compositions may be increased by extending the curing time beyond the stage at which the resin becomes insoluble and somewhat brittle.

*Example 1*

A resin was prepared which contained equal mol. per cents of methyl, phenyl and methyl phenyl siloxane structural units as follows.

A mixture was prepared of the following composition:

|  | Lbs. | Mol. Percent |
|---|---|---|
| $CH_3SiCl_3$ | 10.3 | 33.3 |
| $C_6H_5SiCl_3$ | 14.7 | 33.3 |
| $C_6H_5CH_3SiCl_2$ | 12.9 | 33.3 |

This mixture was added progressively to a mixture of 6.7 gallons of toluene and 10 gallons of water over a 3-hour period at about 25 to 30° C. After the addition was complete, the mixture was agitated for 15 minutes and then allowed to settle for 15 minutes. The aqueous phase was then drained and the toluene solution of resin washed seven times with water. The first two washes were heated to 70° C. To the fifth wash water there was added 100 cc. of concentrated ammonium hydroxide per seven gallons of water. The oily layer was concentrated by distilling off the toluene to a pot temperature of 115° C. This resin solution was bodied by heating to 130 to 150° C. for 13 hours, whereupon 37 pounds of toluene were added, which gave a solution having a viscosity of 265 centistokes.

The resin so produced when in solution and pigmented with powdered aluminum air dries to a non-tacky state and is a desirable paint vehicle resin. When a film of the resin is cured at 140° C. for four hours it is hard and tack-free at room temperature. When cured at 250° C. for 16 hours it is very hard and somewhat brittle.

*Example 2*

A resin was prepared containing 45 mol. per cent of phenyl methyl siloxane structural units, 25 mol. per cent of phenyl siloxane structural units, and 30 mol. per cent of methyl siloxane structural units as follows. A mixture was prepared of the following composition:

|  | Lbs. | Mol. Percent |
|---|---|---|
| $CH_3SiCl_3$ | 121 | 30 |
| $C_6H_5SiCl_3$ | 143 | 25 |
| $CH_3C_6H_5SiCl_2$ | 232 | 45 |

The organosilicon chlorides were gradually added to a mixture of 793 pounds toluene and 1010 pounds of water at a rate such that the maximum temperature did not exceed 25° C. After the addition was complete the aqueous layer containing hydrogen chloride was separated from the toluene solution which solution was washed with water until substantially free of acid. The solvent was then stripped off under a vacuum of 25 to 45 mm. of mercury pressure. This vacuum distillation was employed to effect removal of solvent prior to substantial bodying of the siloxane. The residual siloxane was then bodied by heating without solvent to a temperature of 150 to 170° C. at which temperature the mixture was held until the viscosity of a 50 per cent by weight solution of the resin in toluene was about 60 to 100 cs. The resin was then diluted with toluene to a viscosity of 700 cs., which solution contained about 60 and 65 per cent solids. This resin in solution and pigmented with powdered aluminum when air dried produced a coating which was solid and somewhat tacky. When used as a coating for metal panels, the resin cured in 4 hours at 140° C. to a soft tack-free flexible state. After 160 hours at 150° C., the resin was still flexible. At 250° C., the film cured in less than 1 hour and was still flexible after 45 hours.

The resins of Examples 1 and 2 hereof may be mixed to provide vehicles of intermediate properties for particular uses. Such mixtures pigmented with a standard aluminum paste, prepared of powdered aluminum pasted with a volatile solvent, are desirable for such uses as coating ovens, smoke stacks and exhaust manifolds. When used as coatings which are to be baked, due to the properties of the air-dried resins, it is unnecessary to bake immediately.

I claim:

1. A resinous poly siloxane all the structural units of which are substantially as follows:

$$CH_3SiO_{1.5}$$
$$C_6H_5SiO_{1.5}$$
$$CH_3C_6H_5SiO$$

said siloxane containing 15 to 40 mol. per cent of mono methyl siloxane units, 25 to 55 mol. per cent of mono phenyl siloxane units, and 30 to 50 mol. per cent of methyl phenyl siloxane units, in which siloxane the silicon atoms are linked together by an alternating lattice of oxygen and silicon.

2. A resin for use in solution as a paint and enamel vehicle which resin is a siloxane all the structural units of which are substantially as follows:

$$CH_3SiO_{1.5}$$
$$C_6H_5SiO_{1.5}$$
$$CH_3C_6H_5SiO$$

said siloxane containing 15 to 40 mol. per cent of mono methyl siloxane units, 25 to 55 mol. per cent of mono phenyl siloxane units, and 30 to 50 mol. per cent of methyl phenyl siloxane units, in which siloxane the silicon atoms are linked together by an alternating lattice of oxygen and silicon, which resin is of a degree of condensation sufficient that it is at least a tacky solid in air-dried state and insufficient that it is insoluble in benzene.

3. A resinous organosilicon oxide copolymer in which the silicon and oxygen atoms are present in an alternating lattice thereof, from 15 to 40 per cent of the silicon atoms having as the only organo groups attached thereto by carbon-silicon linkage a single methyl radical, from 25 to 55 per cent of the silicon atoms having as the only organo groups attached thereto by carbon-silicon linkage a single phenyl radical, and the balance of the silicon atoms having as the only organo groups attached thereto by carbon-silicon linkage a single methyl radical and a single phenyl radical, said balance being from 30 to 50 per cent of the silicon atoms present.

4. A metal surface coated with a resinous poly siloxane all the structural units of which are substantially as follows:

$$CH_3SiO_{1.5}$$
$$C_6H_5SiO_{1.5}$$
$$CH_3C_6H_5SiO$$

said siloxane containing 15 to 40 mol. per cent of mono methyl siloxane units, 25 to 55 mol. per cent of mono phenyl siloxane units, and 30 to 50 mol. per cent of methyl phenyl siloxane units, in which siloxane the silicon atoms are linked together by an alternating lattice of oxygen and silicon.

5. A process of protecting a metal surface which comprises applying a resinous siloxane polymer in solution to said metal surface, all the structural units of said siloxane being substantially as follows:

$$CH_3SiO_{1.5}$$
$$C_6H_5SiO_{1.5}$$
$$CH_3C_6H_5SiO$$

said siloxane containing 15 to 40 mol. per cent of mono methyl siloxane units, 25 to 55 mol. per cent of mono phenyl siloxane units, and 30 to 50 mol. per cent of methyl phenyl siloxane units, in which siloxane the silicon atoms are linked together by an alternating lattice of oxygen and silicon, drying the siloxane on said coated surface, and baking the dried siloxane.

6. A paint comprising in combination a resinous poly siloxane all the structural units of which are substantially as follows:

$$CH_3SiO_{1.5}$$
$$C_6H_5SiO_{1.5}$$
$$CH_3C_6H_5SiO$$

said siloxane containing 15 to 40 mol. per cent of mono methyl siloxane units, 25 to 55 mol. per cent of mono phenyl siloxane units, and 30 to 50 mol. per cent of methyl phenyl siloxane units, in which siloxane the silicon atoms are linked together by an alternating lattice of oxygen and silicon, a solvent for the siloxane in which the siloxane is dissolved and a pigment dispersed in the siloxane solution.

EARLE J. SMITH.

REFERENCES CITED

The following references are of record in the file of this patent:

UNITED STATES PATENTS

| Number | Name | Date |
|---|---|---|
| 2,258,218 | Rochow | Oct. 7, 1941 |
| 2,258,222 | Rochow | Oct. 7, 1941 |
| 2,371,050 | Hyde | Mar. 6, 1945 |
| 2,398,672 | Sauer | Apr. 16, 1946 |
| 2,442,212 | Rochow | May 25, 1948 |
| 2,450,594 | Hyde | Oct. 5, 1948 |
| 2,460,457 | Hyde | Feb. 1, 1949 |
| 2,470,479 | Ferguson | May 17, 1949 |
| 2,486,162 | Hyde | Oct. 25, 1949 |
| 2,528,615 | Smith | Nov. 7, 1950 |

OTHER REFERENCES

Rochow, Jour. Amer. Chem. Soc., vol. 63, pp. 798 to 800, March 1941.